United States Patent [19]

Yamaguchi et al.

[11] Patent Number: 4,702,490

[45] Date of Patent: Oct. 27, 1987

[54] POSITIVELY CONTROLLER AUTOMOTIVE SUSPENSION SYSTEM

[75] Inventors: Hirotsugu Yamaguchi, Chigasaki; Naoto Fukushima, Kamakura; Yohsuke Akatsu, Yokohama; Sunao Hano, Yokosuka, all of Japan

[73] Assignee: Nissan Motor Company, Limited, Kanagawa, Japan

[21] Appl. No.: 832,578

[22] Filed: Feb. 24, 1986

[30] Foreign Application Priority Data

Feb. 25, 1985 [JP] Japan .................................. 60-36082
Feb. 25, 1985 [JP] Japan .................................. 60-36083

[51] Int. Cl.⁴ ............................................. B60G 17/08
[52] U.S. Cl. ............................. 280/707; 280/DIG. 1; 267/64.16
[58] Field of Search .............. 280/6 R, 6 H, 703, 707, 280/709, 714, DIG. 1; 267/64.16; 188/299

[56] References Cited

U.S. PATENT DOCUMENTS 1,522,243 1/1925 Hughes ......................... 280/DIG. 1
3,029,089 4/1962 Nashman ...................... 280/DIG. 1
3,124,368 3/1964 Corley et al. ................. 280/DIG. 1
3,258,258 6/1966 Hanna ................................. 280/709

FOREIGN PATENT DOCUMENTS 149204 11/1981 Japan .................................. 280/703

*Primary Examiner*—John J. Love
*Assistant Examiner*—Karin L. Ferriter
*Attorney, Agent, or Firm*—Schwartz, Jeffery, Schwaab, Mack, Blumenthal & Evans

[57] ABSTRACT

A positively controlled automotive suspension system provides both of driving stability and riding comfort by adjusting damping characteristics of the suspension system according to the driving condition. The suspension system is soften in response to bounding and rebounding shock for effectively absorbing road shock. On the other hand, in response to relative displacement of the vehicle body and road wheel assembly, the suspension system serves for regulating the relative distance and whereby provides sufficient driving stability. The system comprises a hollow cylinder defining a chamber, a piston thrustingly received within the chamber of the cylinder and defining therein a first and second fluid chambers, both filled with a working fluid the piston being free to move axially with the chamber, a fluid pressure source, a hydraulic circuit connecting the first and second fluid chamber and the fluid pressure source, a pressure control valve disposed within the hydraulic circuit and adapted to selectively establish and block fluid communication between the first and second fluid chamber and the fluid pressure source, means, responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means, responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

16 Claims, 6 Drawing Figures

POSITIVELY CONTROLLER AUTOMOTIVE SUSPENSION SYSTEM

BACKGROUND OF THE INVENTION

The present invention relates generally to a suspension system for a automotive vehicle. More specifically, the invention relates to an automotive suspension system which itself generates a damping force related to the relative displacement between the vehicle body and road wheels.

Some of the many kinds of automotive suspension systems include hydraulic circuits associated with fluid chambers in hydraulic shock absorbers for the controlling balance between the fluid pressures in the fluid chambers according to the relative displacement between the vehicle body and road wheel. Such hydraulic circuits include a fluid pressure source supplying working fluid at a given pressure to the circuits, and pressure control valves. The pressure control valves hydraulically connect and disconnect the fluid pressure source to the fluid chambers of the hydraulic shock absorbers for controlling pressure supply. The pressure control valves are controlled by an electric or electronic control system which switches the various valve positions to selectively introduce or drain fluid pressure into or from the fluid chambers so as to generate a damping force which suppresses vehicle body and road wheel vibrations.

These conventional positively controlled suspension systems encounter various defects and have not been at all satisfactorily capable of suppressing vibrations or bouncing of the vehicle body in order to ensure riding comfort. Specifically, conventional systems produce damping force by means of an orifice in the hydraulic circuit. However, due to flow resistance through the orifice, fluid pressure differences between the fluid chambers in the shock absorbers cannot be easily balanced. When the balance is disturbed, the shock absorber tends to transmit vibration of the road wheel to the vehicle body which degrades riding comfort.

SUMMARY OF THE INVENTION

Therefore, it is an object of the present invention to provide an automotive suspension system which has a hydraulic damping force control circuit capable of effectively suppressing vehicle vibrations, thus ensuring riding comfort.

In order to accomplish the aforementioned and other objects, a positively controlled automotive suspension system, according to the present invention, comprises: a hollow defining a chamber, a piston thrustingly received within the chamber of the cylinder and defining therein a first and second fluid chambers, both filled with a working fluid the piston being free to move axially with the chamber, a fluid pressure source, a hydraulic circuit connecting the first and second fluid chamber and the fluid pressure source, a pressure control valve disposed within the hydraulic circuit and adapted to selectively establish and block fluid communication between the first and second fluid chamber and the fluid pressure source, means, responsive to relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means, responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

According to one aspect of the present invention, an automotive suspension sytem comprises a hollow cylinder defining a chamber, a piston thrustingly received within the chamber of the cylinder and defining therein a first and second fluid chambers, both filled with a working fluid the piston being free to move axially with the chamber, a fluid pressure source, a hydraulic circuit connecting the first and second fluid chamber and the fluid presure source, a pressure control valve disposed within the hydraulic circuit and adapted to selectively establish and block fluid communication between the first and second fluid chamber and the fluid pressure source, means, responsive to the relative displacement between a vehicle body and road wheel assembly out of a predetermined normal range, for controlling the pressure control valve so as to adjust the fluid pressure in the first and second fluid chambers in order to adjust the relative distance between the vehicle body and the road wheel assembly back to within the predetermined normal range, and means, responsive to bounding and rebounding motion of the road wheel relative to the vehicle body, for controlling the pressure control valve so as to adjust the fluid pressure in the first and second fluid chambers to assist smooth displacement of the piston within the cylinder thereby absorbing bounding and rebounding energy which would otherwise be transmitted to the vehicle body.

In the preferred construction, the automotive suspension system further comprises elastic means associated with the piston through the piston rod for allowing limited axial movement of the piston in response to bounding and rebounding motion of the road wheel assembly.

The pressure control valve comprises a valve housing defining first and second ports respectively connected to the first and second fluid chambers, a third port connected to the fluid pressure source to introduce therefrom a fluid pressure and a fourth port connected to fluid pressure source for draining the pressurized working fluid for reducing fluid pressure, and a valve member selectively establishing fluid communication between the first and second ports and the third and fourth ports for adjusting the fluid pressure in the first and second fluid chambers. The valve member comprises a first member associated with the first means and operable in response to relative displacement between the vehicle body and the road wheel assembly and a second member associated with the second means and operable in response to bounding and rebounding motion of the road wheel assembly. The second member is physically connected to the piston rod to establish a working fluid circulating path in which one of the first and second fluid chambers being compressed due to piston stroke is connected to the fourth port and the other of the first and second fluid chamber being expanded is connected to the third port.

The relative displacement responsive means comprises a sensor for monitoring relative distance between the vehicle body and the road wheel assembly for producing a sensor signal indicative of measured relative distance, the relative displacement responsive means comparing the sensor signal with a reference value defining the predetermined normal range for producing a control signal to operate the first member to adjust fluid pressure in the first and second fluid chambers so as to adjust the relative distance between the vehicle body and the road wheel assembly within the normal range. The relative displacement responsive means further comprises an actuator associated with the first member for driving the latter in response to the control signal for regulating relative distance between the vehicle body and the road wheel assembly.

The first member comprises a hollow cylindrical sleeve having a cylindrical wall interposed between the inner periphery of the valve housing and the valve member, the cylinderical wall having a plurality of radially extending through openings respectively located in alignment with the ports formed in the valve housing at the nuetral position ofthe sleeve, the sleeve being associated with the actuator to be shifted from the neutral position for establishing fluid communication between the first and second fluid ports and the third and fourth ports. The second member comprises a valve spool defining annular grooves serving as fluid path for passing working fluid when the first and second ports are selectively communicated with the third and fourth ports.

The first and second member comprise a common valve spool defining annular groove serving as fluid paths for passing working fluid whem the first and second ports are selectively communicated with the third and fourth ports, the valve spool having longitudinal ends cooperative with the bounding and rebounding responsive means for selectively establishing fluid communication between the first and second ports and the third and fourth ports. The longitudinal ends of the valve spool valve substantially the same diameters to each other, and the bounding and rebounding responsive means subjects fluid pressures of the first and second fluid chambers to the corresponding longitudinal ends of the valve spool so as to be shifted within the valve housing for selectively establishing fluid communication between the first and second ports and the third and fourth ports depending upon the fluid pressure difference between the first and second fluid chambers. The relative displacement responsive means comprises a sensor for monitoring relative distance between the vehicle body and the road wheel assembly for producing a sensor signal indicative of measured relative distance, the relative displacement responsive means comparing the sensor signal value with a reference value defining the predetermined normal range for producing a control signal to operate the first member to adjust fluid pressures in the first and second fluid chambers so as to adjust the relative distance between the vehicle body and the road wheel assembly within the normal range. The relative displacement responsive means further comprises an actuator associated with the first member for driving the latter is response to the control signal for regulating relative distance between the vehicle body and the road wheel assembly. The actoator is physically associated with the valve spool for shifting the latter to selectively establish fluid communication between the first and second ports and the third and fourth ports.

BRIEF DESCRIPTION OF THE DRAWINGS

In the drawings:

FIG. 3 is similar to FIG. 2, but shows the case of lowering of the piston upon release of static load or the like;

DESCRIPTION OF THE PREFERRED EMBODIMENT

Figure 1:
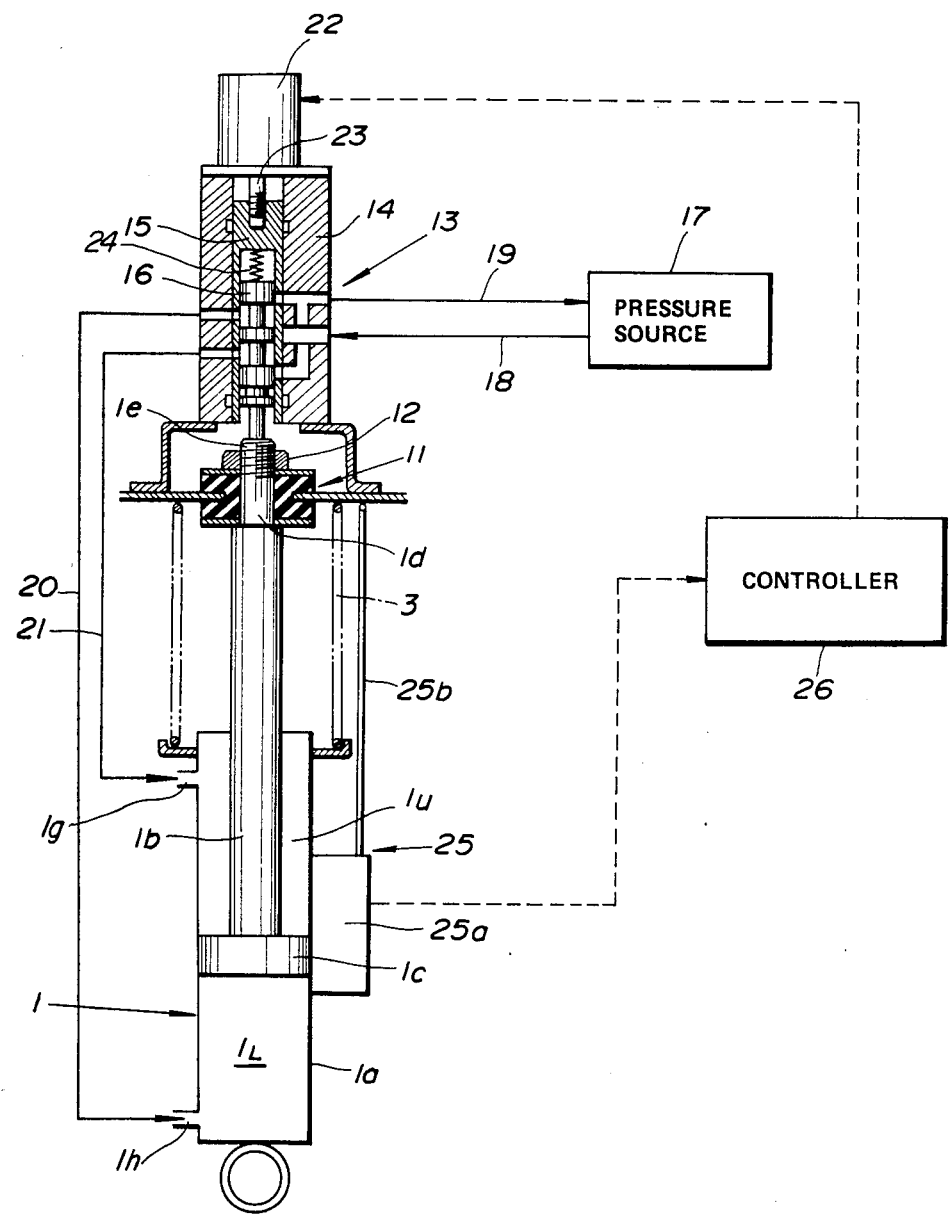
FIG. 1 is a diagram of the first embodiment of a suspension control system according to the present invention.

Referring now to the drawings, particularly to FIG. 1, the first embodiment of a suspension control system, according to the present invention, includes a hydraulic shock absorber 1. The shock absorber has a hollow cylinder 1a defining an internal spaced receiving a reciprocating piston 1c. The shock absorber cylinder 1a is connected to a wheel assembly (not shown) acting as an unsprung mass. On the other hand, the piston 1c is connected to a piston rod 1b which extends from the shock absorber cylinder 1a and is connected to a vehicle body 2, i.e. the sprung mass.

The piston 1c divides the interior of the shock absorber cylinder 1a into upper and lower chambers $1_U$ and $1_L$. Both of the upper chambers $1_U$ and $1_L$ are filled with a working fluid.

A lower spring seat 1d extends from the outer periphery of the shock absorber cylinder 1a to seat the lower end of a suspension coil spring 3. The upper end of the suspension coil spring 3 is seated on the vehicle body panel 2. The suspension coil spring 3 thus exerts a resilient force between the vehicle body and the wheel assembly which restricts relative displacement therebetween.

A bushing assembly 11 is interposed between the piston rod 1b and the vehicle body 2. The bushing assembly 11 comprises a rubber bushing 11a and a pair of disc-shaped metal plates 11b and 11c bonded onto the respective upper and lower faces of the rubber bushing 11a. The metal plates 11b and 11c serve as a collar for the bushing assembly and prevent the rubber bushing 11a from coming into direct contact with the piston rod and a fastening nut 12. The rubber bushing 11a has an annular groove 11d which engages the edges of an opening 2a through the vehicle body panel.

The bushing assembly 11 is generally designed to absorb relatively high-frequency, low-amplitude vibrations transmitted from the wheel assembly. On the other hand, the bushing assembly 11 allows vertical displacement of the piston rod 1b and the piston 1c by deformation of the rubber bushing 11a.

The upper end 1f of the piston rod 1b extends upward through the bushing assembly 11 and abuts the lower end of a spool valve 16 of a pressure control valve 13. The pressure control valve 13 performs two functions, i.e. vehicle level regulation for holding the vehicle height generally constant and shock absorption for absorbing road shock and suppressing transmission of vibrations from the wheel assembly. For this purpose, the pressure control valve 13 comprises a cylindrical valve housing 14 defining therein a valve chamber. The valve chamber of the valve housing 14 has a greater inner diameter than the outer diameters of lands 16a, 16b and 16c on the spool valve 16. The wall of an inverted-cup-shaped sleeve 15 fits within the clearance between the inner periphery of the valve chamber of the valve housing 14 and the outer periphery of the spool valve 16. Annular sealing rings 15f on the inner periphery of the valve chamber establish a liquid-proof seal between valve 16 and housing 14.

The valve housing 14 has an inlet port 14a connected to the outlet of a fluid pressure source 17 through a pressure supply line 18 and drain ports 14b and 14c connected to the inlet of the fluid pressure source through a common drainage line 19. The valve housing 14 also has outlet ports 14d and 14e communicating with ports 1g and 1h in the shock absorber cylinder 1a via pressure lines 20 and 21. The port 1g is in communication with the upper chamber $1_U$ and the port 1h is in communication with the lower chamber $1_L$.

The sleeve 15 has a plurality of radial through openings 15a, 15b, 15c, 15d and 15e. The openings 15a, 15b, 15c, 15d and 15e are in alignment with the corresponding inlet port 14a, the outlet ports 14b and 14c and the outlet ports 14d and 14e, respectively, while the sleeve is in its normal inoperative or rest position.

As set forth, the valve spool 16 has lands 16a, 16b and 16c spaced at regular intervals so as to define annular grooves 16d and 16e therebetween. The annular grooves 16d and 16e serve to establish fluid communication between the upper and lower chambers $1_U$ and $1_L$ and the fluid pressure source when aligned with one of the inlet or drain ports 14a, 14b and 14c and, at the same time, with the outlet ports 14d and 14e. The valve spool 16 is normally biased downward by means of a bias spring 24 twentyfour disposed between the upper wall of the sleeve 15 and the top of the spool valve.

The sleeve 15 is restricted from rotation about the valve housing and has a threaded hole in its upper face. The threaded hole faces upward and engages a screw 23. The screw 23 is driven to rotate by a step motor 22. Therefore, when the screw 23 is driven by the step motor 22 in one direction, the sleeve 15 shifts upward and in the other direction, the sleeve is shifts downward.

The step motor 22 is connected for input from a controller 26 which is, in turn, connected for input from a stroke sensor 25. The stroke sensor 25 may comprise a sensor section including a sensor element such as a potentiometer and the like, and a sensor rod 25b. In the shown embodiment, the sensor road 25b extends upward from the sensor section 25a fixed to the outer periphery of the shock absorber cylinder 1a. The upper end of the sensor rod 25b is in constant contact with the vehicle body panel 2. Therefore, according to relative displacement between the vehicle body and the wheel assembly, the sensor rod 25b moves relative to the sensor section 25a. The sensor section 25a produces a sensor signal representative of the distance between the vehicle body and the wheel assembly. The controller 26 receives the sensor signal from the stroke sensor 25. The controller 26 compares the sensor signal value which is representative of the relative distance between the vehicle body and the wheel assembly, with a reference value which is representative of the relative distance between the vehicle body and wheel assembly at a predetermined normal condition. The controller 26 thus derives the difference between the sensor signal value and the reference value to derive a control signal for the step motor 22.

In the shown embodiment, the suspension system performs two functions, i.e. vehicle level regulation and shock absorption. In the vehicle level regulating operation, the suspension system performs the vehicle level adjustment not only in respnose to static load, such as the weight of passengers, luggage and so forth, but also dynamic load, such as rolling and pitching forces exerted on the vehicle body. On the other hand, in the shock absorbing operation, the suspension system serves to suppress vehicle body vibrations caused by bounding and rebounding motion of the road wheels due to road shocks.

In the vehicle level regulating operation, the relative displacement of the vehicle body and the road wheel is detected by the stroke sensor 25. According to relative distance between the vehicle body and the wheel assembly, the stroke sensor 25 produces the sensor signal indicative thereof. The controller compares the sensor signal value with the reference value to distinguish whether the relative distance between the vehicle body and the wheel assembly lies within a predetermined normal range. When the distance between the vehicle body and the wheel assembly is greater than the upper limit of the predetermined range, the controller 26 outputs a control signal to the step motor 22 which orders the step motor 22 to run in the first forward direction.

Figure 2:
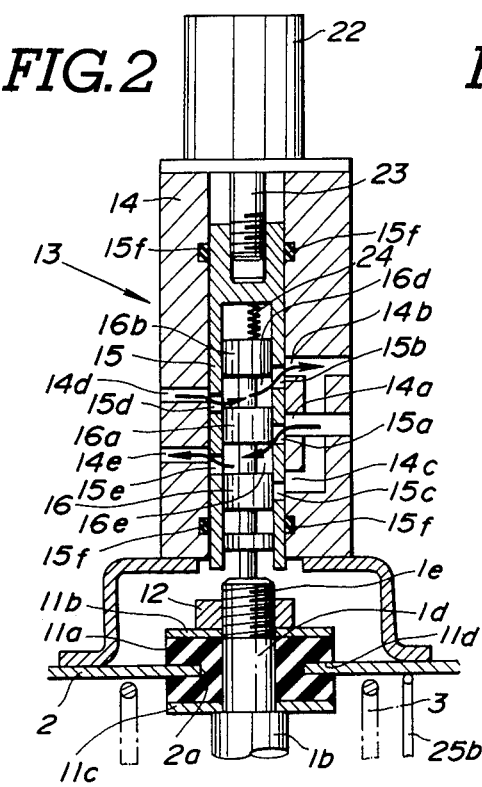
FIG. 2 is a section through the spool valve and associated elements shown in FIG. 1, showing the case of elevation of the piston within the shock absorber under static load.

Forward rotation of the step motor 22 shifts the sleeve 15 downward, as can be seen by comparing FIGS. 1 and 2. At the position shown in FIG. 2, the opening 15b of the sleeve 15 is slightly offset from the drain port 14b of the valve housing 14 so as to establish fluid communication between the annular groove 16d and the drain port 14b. At the same time, the opening 15a is slightly offset from the inlet port 14a to establish fluid communication between the annular groove 16e and the inlet port 14a. The annular grooves 16d and 16e are in communication with the outlet ports 14d and 14e at this time.

As a result, the lower fluid chamber $1_L$ communicates with the fluid pressure source 17 through the drain port 14b, the opening 15b, the annular groove 16d of the valve spool 16, the outlet port 14d and the pressure line 20. At the same time, fluid communication between the upper fluid chamber $1_U$ and the fluid pressure source 17 is establshed through the pressure line 21, the outlet port 14e, the annular groove 16e, inlet port 14a and the drainage line 19. Therefore, the fluid pressure in the upper fluid chamber $1_U$ is increased and the fluid pressure in the lower fluid chamber $1_L$ is decreased so as to drive the piston 1c downward until the fluid pressures on opposite sides of the piston balance.

The duration of the control signal to be applied to the step motor corresponds to the piston stroke need to return the relative distance between the vehicle body and wheel assembly to the normal range. Therefore, the duration of the control signal will be derived depending upon the difference between the sensor signal value and the reference value. After the given duration is over, the step motor 22 is driven in reverse to return the sleeve to its initial position. At the initial position of the sleeve 15, fluid communication between the fluid pressure source 17 and the annular grooves 16d and 16e is blocked. Therefore, the fluid pressures in the upper and lower fluid chambers $1_U$ and $1_L$ are held in balance.

Figure 3:
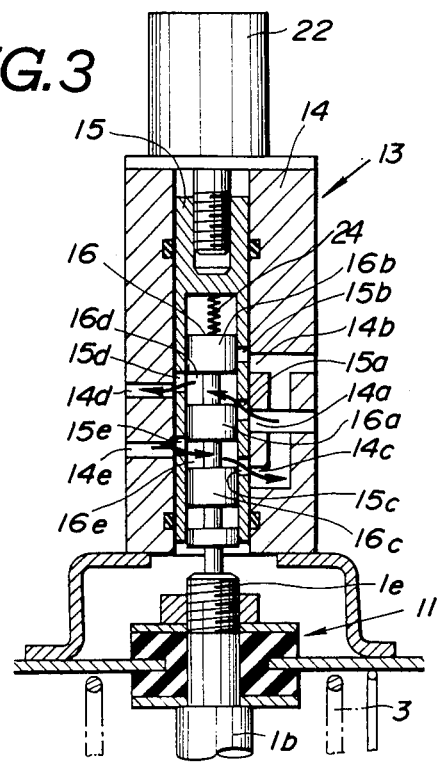

On the other hand, when the relative distance between the vehicle body and wheel assembly drops below the normal range, the controller 26 outputs a control signal ordering the step motor 22 to rotate in the reverse direction. This causes the sleeve 15 to shift upward as shown in FIG. 3. This upward shift of the sleeve offsets the opening 15c slightly from the drain port 14c and so establishes fluid communication between the drain port 14c and the annular groove 16e. At the same time, the opening 15a is slightly offset from the inlet port 14a so as to establish fluid communication between the inlet port 14a and the annular groove 16d. As a result, the lower fluid chamber $1_L$ is connected to the fluid pressure source 17 via the pressure supply line 18, the inlet port 14a, the opening 15a, the outlet port 14e and the pressure line 21, to increase the fluid pressure therein. Similarly, the upper fluid chamber $1_U$ is connected to the fluid pressure source 17 via the drainage line 19, the drain port 14c, the opening 15c, the outlet port 14d and the pressure line 20. As a result, the piston 1c is shifted upward to adjust the relative distance between the vehicle body and the wheel assembly back within the normal range.

On the other hand, when the relative distance between the vehicle body and wheel assembly lies within the normal range, the sleeve 15 is held in its initial position, at which the openings 15a, 15b, 15c, 15d and 15e are in alignment with the corresponding ports 14a, 14b, 14c, 14d and 14e.

Under these conditions, when an impulse is applied to the road wheel, the piston 1c and the piston rod 1b are driven axially, causing deformation of the rubber bushing 11a of the bushing assembly 11. Movement of the piston rod 11b causes corresponding movement of the spool valve 16. The stroke limits the piston rod 1b and the spool valve 16 can be adjusted by adjusting the deformation characteristics of bushing assembly 11, as shown in FIG. 4.

When the road wheels are driven upward the piston rod 1b and the piston 1c are driven upward within the range allowed by the bushing assembly 11. Therefore, the valve sleeve 16 is also shifted upward. As a result, the annular groove 16d is moved to a position in which it establishes fluid communication between the drain port 14b and the outlet port 14d and thus establishes fluid communication between the lower fluid chamber $1_L$ and the drainage line 19. At the same time, the annular groove establishes fluid communication between the inlet port 14a and the outlet port 14e, and thus establishes fluid communication between the upper fluid chamber $1_U$ and the pressure supply line 18. Therefore, the fluid pressure in the upper fluid chamber $1_U$ increases and the fluid pressure in the lower fluid chamber $1_L$ decreases. This allows the shock absorber cylinder 1a to shift upwardly relative to the piston 1c. This upward shift of the shock absorber cylinder 1a relative to the piston 1c allows the wheels to move upward while leaving the piston rod 1b and thus the vehicle body in their initial position. Therefore, the rebounding shock exerted on the road wheel is successfully absorbed and the vibration energy due to the road shock is not transmitted to the vehicle body.

Figure 4:
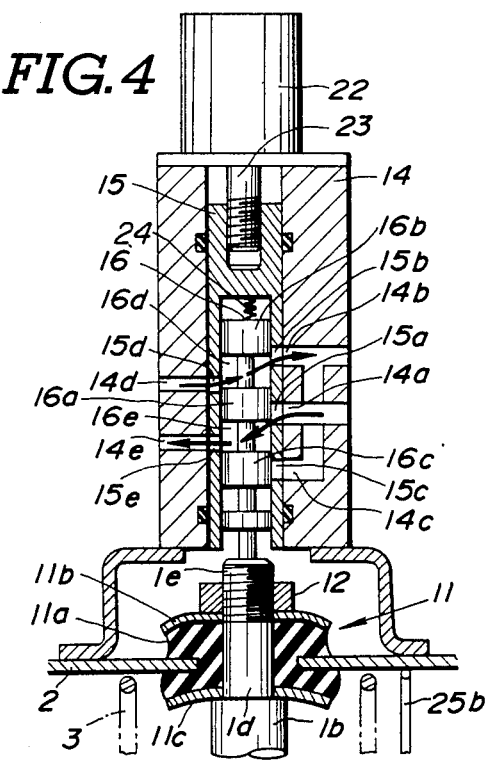
FIG. 4 is similar to FIGS. 2 and 3, but shows the results of upward displacement of the piston due to road irregularities.
Figure 5:
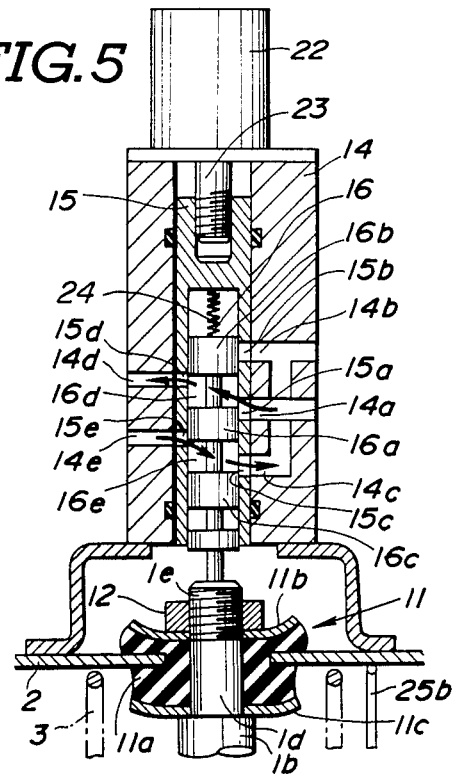
FIG. 5 is similar to FIG. 4, but shows the case of downward displacement of the piston.

Similarly, when a bounding shock is exerted on the road wheel such as when the road wheel drops into a hole in the road, the piston rod 1b and the piston 1c shift downward, as shown in FIG. 4, causing an increase in the fluid pressure in the upper fluid chamber $1_U$ relative to that in the lower fluid chamber $1_L$. The spool valve 16 follows the downward shift of the piston rod 1b since it is biased by the biasing spring 24. As a result, the fluid communication between the upper fluid chamber $1_U$ and the fluid pressure source 17 is established by the fluid path of the pressure line 20, the outlet port 14e, the annular groove 16e, the opening 15c, the drain port 15c and the drainage line 19. At the same time, fluid communication between the lower fluid chamber $1_L$ and the fluid pressure source 17 is established through the pressure line 21, the outlet port 14e, the annular groove 16d, the opening 15a, the inlet port 14a and the pressure supply line 18. Thus, the fluid pressure in the lower chamber $1_L$ increases and the fluid pressure in the upper fluid chamber $1_U$ decreases. This allows shifting of the shock absorber cylinder 1a to freely move downward in order to compensate for the bounding shock.

As will be appreciated hereform, the arrangement of the aforementioned first embodiment absorbs wheels shocks successfully and satisfactorily so that the vehicle body will be essentially vibration-free. On the other hand, the vehicle level regulating function successfully and satisfactorily suppress roll, pitch and/or bounding of the vehicle body to ensure good driving stability.

Figure 6:
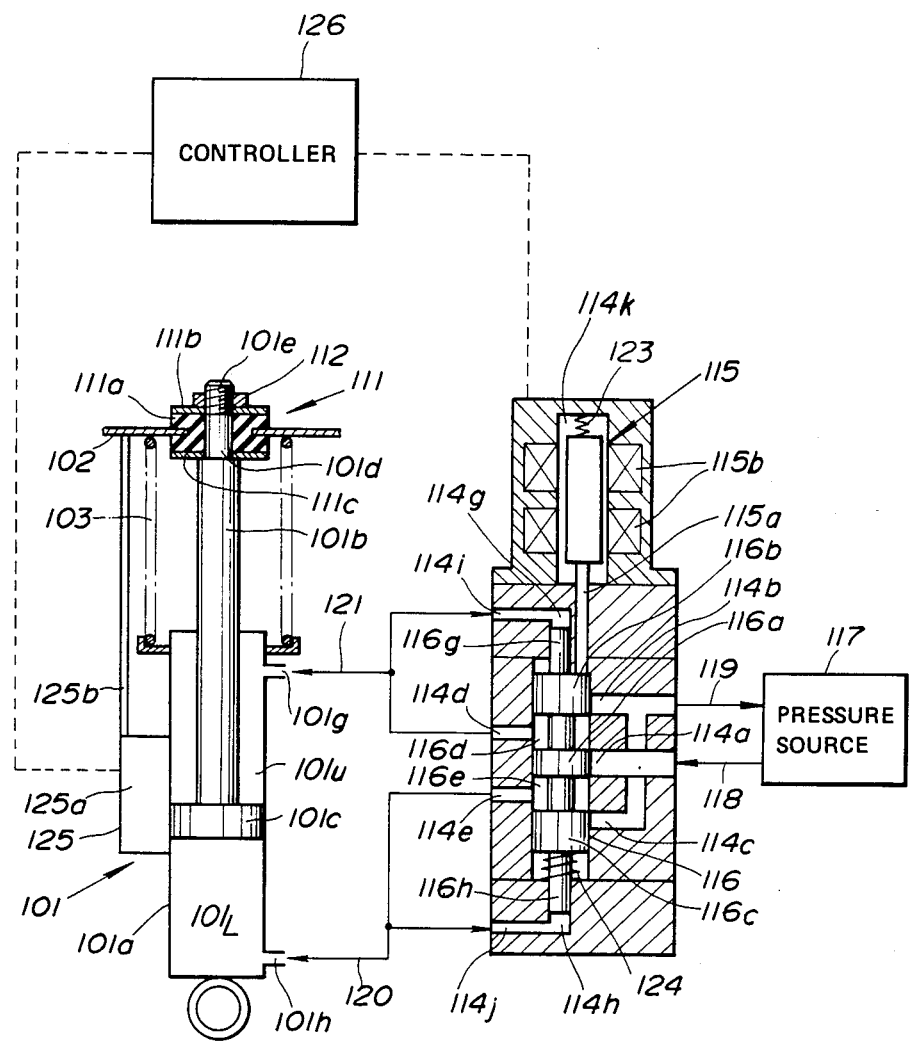
FIG. 6 is a diagram of a second embodiment of a suspension control system of the invention.

As in the first embodiment, the second embodiment of the suspension control system shown in FIG. 6 includes a hydraulic shock absorber 101 with a hollow cylinder 101a defining an internal space receiving a reciprocating piston 101c. The shock absorber cylinder 101a is connected to a wheel assembly (not shown) acting as the unsprung mass. On the other hand, the piston 101c is connected to a piston rod 101b which projects from the shock absorber cylinder 101a and is connected to a vehicle body 102 acting as the sprung mass. The piston 101c divides the interior of the shock absorber cylinder 11a into upper and lower chambers $101_U$ and $101_L$. The upper and lower chambers $101_U$ and $101_L$ are both filled with a working fluid.

A lower spring seat 101d extends from the outer periphery of the shock absorber cylinder 11a to seat the lower end of a suspension coil spring 103. The upper end of the suspension coil spring 103 is seated on the vehicle body panel 102. The suspension coil spring 103 thus exerts a resilient force between the vehicle body and the wheel assembly so as to restrict relative displacement therebetween.

A bushing assembly 111 is interposed between the piston rod 101b and the vehicle body 102. the bushing assembly 111 comprises a rubber bushing 111a and a pair of disc-shaped metal plates 111b and 111c bonded onto respective upper and lower faces of the rubber bushing 111a. The metal plates 111b and 111c serve as a collar for the bushing assembly and protect the rubber bushing 111a from direct contact with the piston rod and fastening nut 112. The rubber bushing 111a has an annular groove 111d. The annular groove 111d engages the edges of an opening 2a through the vehicle body panel.

The shown embodiment employs a fluid pressure responsive pressure control valve 113 which establishes and blocks fluid communication between the upper and lower fluid chambers $101_U$ and $101_L$ depending upon the fluid pressure difference therebetween. As in the first embodiment, the pressure control valve 113 regulates vehicle height so as to hold the vehicular height to within a predetermined normal range. For this purpose, the pressure control valve 113 comprises a cylindrical valve housing 114 defining therein a valve chamber 114f. A spool valve 116 is housed within the valve chamber so as to be free to move axially.

The valve chamber 114f has narrower sections 114g and 114h respectively communicating with the upper and lower fluid chambers $101_U$ and $101_L$ via communication ports 114i and 114h. The spool valve 116 has upper and lower axial extensions 116g and 116h respectively entering the narrower sections 114g and 114h of the valve chamber 114f. The narrower sections 114g and 114h and the corresponding upper and lower extensions 116g and 116h have substantially the same diameter so that the fluid pressure forces exerted on opposite ends of the upper and lower extensions 116g and 116h balance when the fluid pressure in the upper and lower fluid chambers are equal.

The valve housing 114 has an inlet port 114a connected to the outlet of a fluid pressure source 117 through a pressure supply line 118, and drain ports 114b and 114c connected to the inlet of the fluid pressure source through a common drainage line 119. The valve housing 114 also has outlet ports 114d and 114e communicating with ports 101g and 101h in the shock absorber cylinder 11a via pressure lines 120 and 121. The port 101g is in communication with the upper chamber $101u$ and the port 111h is in communication with the lower chamber 101l.

The spool valve 116 is associated with an electrical proportioning solenoid 115 housed within a chamber 114k in the valve housing 114. The solenoid 115 has an actuation rod 115a extending through an opening 114L to contact the land 116b of the valve spool 116. A pair of solenoid coils 115b is also housed in the chamber 114k and connected to a controller 126. The solenoid 115 is constantly biased downward to exert a downward force an the valve sleeve 116 through the actuation rod, by a spring 123. A spring 124 housed in the valve chamber 114k seats against the land 116c of the valve spool 116, and exerts an upward counter-force on the valve spool 116.

As in the first embodiment, the controller is connected to a stroke sensor 125. The stroke sensor 125 may comprise a sensor section 125a, including a sensor element such as a potentiometer and the like, and a sensor rod 125b. In the shown embodiment, the sensor rod 125b extends upward from the sensor section 125a fixed to the outer periphery of the shock absorber cylinder 11a. The upper end of the sensor road 125b is in constant contact with the vehicle body panel 102. Therefore, according to the relative displacement between the vehicle body and the wheel assembly, the sensor rod 125b moves relative to the sensor section 125a. The sensor section 125a produces a sensor signal representative of the relative distance between the vehicle body and the wheel assembly. The controller 126 receives the sensor signal from the stroke sensor 125. The controller 126 compares the sensor signal value, which is representative of the relative distance between the vehicle body and the wheel assembly, with a reference value which is representative of the relative distance between the vehicle body and wheel assembly at a predetermined normal condition. The controller 26 thus derives the difference between the sensor signal value and the reference value to derive a control signal for the solenoid 115.

As in the first embodiment, the suspension system of the second embodiment performs two functions, i.e. vehicle level regulation and shock absorption. In the vehicle level regulating operation, the suspension system adjusts the vehicle level not only in accordance with static load, such as the weight of passengers, luggage and the like, but also dynamic loads, such as rolling and pitching of the vehicle body. On the other hand, the suspension system also serves to suppress vehicle body vibrations caused by bounding and rebounding motion of the road wheels due irregularities in the road surface.

In this second embodiment, vehicle height regulation and shock absorption are both mediated by the spool valve 116 which adjusts the fluid pressure in the upper and lower fluid chambers. Specifically, in order to regulate vehicle height, the solenoid 115 is controlled to move the spool valve upward and downward in response to the control signal from the controller 126. On the other hand, in order to absorb wheel shock, the spool valve 116 is driven upward and downward by the fluid pressures in the narrower sections 114g and 114h of the valve chamber 114k.

In practical suspension control, when the stroke sensor signal from the stroke sensor 125 indicative of the distance between the vehicle body and the wheel assembly increases out of the normal range, the controller 126 responds by activating the solenoid 115 to move the spool valve 116 upward. On the other hand, when the stroke sensor signal indicates that the distance between the vehicle body and the wheel assembly has dropped below the normal range, the controller 126 activates the solenoid to shift the spool valve 116 downward.

On the other hand, when the piston 101c of the shock absorber 101 shifts upward, causing deformation of the bushing assembly 111, the fluid pressure in the narrower section 114g becomes higher than that in the narrower section 114h. Thus, the valve spool 116 is shifted downwardly. Conversely, when the piston 101c shifts downward, the fluid pressure in the lower fluid chamber increases and becomes higher than that in the upper fluid chamber. As a result, the fluid pressure in the narrower section 114h becomes higher than that in the narrower section 114g, which causes upward movement of the spool valve 116.

When the valve sleeve 116 is also shifted upward, the annular groove 116d establishes fluid communication between the drain port 114b and the outlet port 114d and thus establishes fluid communication between the lower fluid chamber $101_L$ and the drainage line 119. At the same time, the annular groove establishes fluid communication between the inlet port 114a and the outlet port 114e, and thus establishes fluid communication between the upper fluid chamber $101_U$ and the pressure supply line 118. Therefore, the fluid pressure in the upper fluid chamber $101_U$ increases and the fluid pressure in the lower fluid chamber $101_L$ decreases. This allows the shock absorber cylinder 101a to shift upward relative to the piston 101c while the piston 101c and the piston rod 101b remain essentially at rest. Therefore, the rebounding shock exerted on the road wheels is successfully absorbed and thus the vibration energy due to the road shock while not be transmitted to the vehicle body.

Similarly, when the spool valve 116 is shifted downward, fluid communication between the upper fluid chamber $101_U$ and the fluid pressure source 117 is established via the fluid path of the pressure line 120, the outlet port 114e, the annular groove 116e, the opening 115c, the drain port 115c and the drainage line 119. At the same time, fluid communication between the lower fluid chamber 101$_L$ and the fluid pressure source 117 is established through the pressure line 121, the outlet port 114e, the annular groove 116d, the opening 115a, the inlet port 114a and the pressure supply line 118. Thus, the fluid pressure in the lower chamber 11$_L$ increases and the fluid pressure in the upper fluid chamber 101$_U$ decreases. This allows downward shifting of the shock absorber cylinder 11a to successfully absorb the bounding shock.

As will be appreciated herefrom, the arrangement of the aforementioned first embodiment can successfully and satisfactorily absorb road shocks so that the vehicle body can be maintained substantially free from vibrations due to road shock. At the same time, the suspension system successfully and satisfactorily suppresses roll, pitch and/or bounding of the vehicle body to ensure good driving stability.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive suspension system comprising:
   a hollow cylinder defining a chamber;
   a piston thrustingly received within said chamber of said cylinder and defining therein a first and second fluid chambers, both filled with a working fluid said piston being free to move axially within said chamber;
   a fluid pressure source;
   a hydraulic circuit connecting said first and second fluid chamber and said fluid pressure source;
   a pressure control valve disposed within said hydraulic circuit and selectively establishing and blocking fluid communication between said first and second fluid chamber and said fluid pressure source;
   first means, responsive to relative displacement between a vehicle body and road wheel assembly out of a predetermined normal range, for controlling said pressure control valve so as to adjust the fluid pressure in said first and second fluid chambers in order to adjust the relative distance between said vehicle body and said road wheel assembly back to within said predetermined normal range; and
   second means, responsive to bounding and rebounding motion of said road wheel relative to said vehicle body, for controlling said pressure control valve so as to adjust the fluid pressure in said first and second fluid chambers to assist smooth displacement of said piston within said cylinder thereby absorbing bounding and rebounding energy which would otherwise be transmitted to said vehicle body.

2. An automotive suspension system as set forth in claim 1, which further comprises elastic means associated with said piston through said piston rod for allowing limited axial movement of said piston in response to bounding and rebounding motion of said road wheel assembly.

3. An automotive suspension system as set forth in claim 1, wherein said pressure control valve comprises a valve housing defining first and second ports respectively connected to said first and second fluid chambers, a third port connected to said fluid pressure source to introduce therefrom a fluid pressure and a fourth port connected to fluid pressure source for draining the pressurized working fluid for reducing fluid pressure, and valve means for selectively establishing fluid communication between said first and second ports and said third and fourth ports for adjusting the fluid pressure in said first and second fluid chambers.

4. An automotive suspension system as set forth in claim 3, wherein said valve means includes a valve spool defining annular grooves serving as fluid paths for passing working fluid when said first and second ports are selectively communicated with said third and fourth ports, said valve spool having longitudinal ends cooperative with said bounding and rebounding responsive second means for selectively establishing fluid communication between said first and second ports and said third and fourth ports.

5. An automotive suspension system comprising:
   a hollow cylinder defining a chamber;
   a piston thrustingly received within said chamber of said cylinder and defining therein first and second fluid chambers, both filled with a working fluid, said piston being free to move axially with said chamber;
   a fluid pressure source;
   a hydraulic circuit connecting said first and second fluid chambers and said fluid pressure source;
   a pressure control valve disposed within said hydraulic circuit and selectively establishing and blocking fluid communication between said first and second fluid chambers and said fluid pressure source;
   first means, responsive to relative displacement between a vehicle body and road wheel assembly out of a predetermined normal range, for controlling said pressure control valve so as to adjust the fluid pressure in said first and second fluid chambers in order to adjust the relative distance between said vehicle body and said road wheel assembly back to within said predetermined normal range;
   second means, responsive to bounding and rebounding motion of said road wheel relative to said vehicle body, for controlling said pressure control valve so as to adjust the fluid pressure in said first and second fluid chambers to assist smooth displacement of said piston within said cylinder thereby absorbing bounding and rebounding energy which would otherwise be transmitted to said vehicle body;
   wherein said pressure control valve comprises a valve housing defining said and second ports respectively connected to said first and second fluid chambers, a third port connected to said fluid pressure source to introduce therefrom a fluid pressure and a fourth port connected to said fluid pressure source for draining the pressurized working fluid for reducing fluid pressure and valve means for selectively establishing fluid communication between said first and second ports and said third and fourth ports for adjusting the fuild pressure in said first and second fluid chambers; and
   wherein said valve means comprises a first member functionally coupled to said first means and operable in response to relative displacement between said vehicle body and said road wheel assembly and a second member functionally coupled to said second means and operable in response to bounding and rebounding motion of said road wheel assembly.

6. An automotive suspension system as set forth in claim 5, wherein said second member is physically connected to said piston rod to establish a working fluid circulating path in which one of said first and second fluid chambers is compressed due to piston stroke and is connected to said fourth port and the other of said first and second fluid chamber being expanded is connected to said third port.

7. An automotive suspension system as set forth in claim 6, wherein said relative displacement responsive first means comprises a sensor for monitoring relative distance between said vehicle body and said road wheel assembly for producing a sensor signal indicative of measured relative distance, said relative displacement responsive first means comparing said sensor signal value with a reference value defining said predetermined normal range for producing a control signal to operate said first member to adjust fluid pressures in said first and second fluid chambers so as to adjust the relative distance between said vehicle body and said road wheel assembly within said normal range.

8. An automotive suspension system as set forth in claim 7, wherein said relative displacement responsive means further comprises an actuator associated with said first member for driving the latter in response to the control signal for regulating relative distance between said vehicle body and said road wheel assembly.

9. An automotive suspension system as set forth in claim 8, wherein said first member comprises a hollow cylindrical sleeve having a cylindrical wall interposed between the inner periphery of said valve housing and said second member, said cylinderical wall having a plurality of radially extending through openings respectively located in alignment with said ports formed in said valve housing at the neutral position of said sleeve, said sleeve being associated with said actuator to be shifted from said neutral position for establishing fluid communication between said first and second fluid ports and said third and fourth ports.

10. An automotive suspension system as set forth in claim 9, wherein said second member comprises a valve spool defining annular grooves serving as fluid path for passing working fluid when said first and second ports are selectively communicated with said third and fourth ports.

11. An automotive suspension system as set forth in claim 10, wherein said longitudinal ends of said valve spool have substantially the same diameters to each other, and said bounding and rebounding responsive second means subjects fluid pressures of said first and second fluid chambers to the corresponding longitudinal ends of said valve spool so as to be shifted within said valve housing for selectively establishing fluid communication between said first and second ports and said third and fourth ports depending upon the fluid pressure difference between said first and second fluid chambers.

12. An automotive suspension system as set forth in claim 11, wherein said relative displacement responsive first means comprises a sensor for monitoring relative distance between said vehicle body and said road wheel assembly for producing a sensor signal indicative of measured relative distance, said relative displacement responsive first means comprising said sensor signal value with a reference value defining said predetermined normal range for producing a control signal to operate said first member to adjust fluid pressures in said first and second fluid chambers so as to adjust the relative distance between said vehicle body and said road wheel assembly within said normal range.

13. An automotive suspension system as set forth in claim 12, wherein said relative displacement responsive first means further comprises an actuator associated with said first member for driving the latter in response to the control signal for regulating relative distance between said vehicle body and said road wheel assembly.

14. An automotive suspension system as set forth in claim 13, wherein said actuator is physically associated with said valve spool for shifting the latter to selectively establish fluid communication between said first and second ports and said third and fourth ports.

15. An automotive suspension system comprising:
a hollow cylinder defining a chamber;
a piston thrustingly received within said chamber of said cylinder and defining therein first and second fluid chambers, both filled with a working fluid, said piston being free to move axially with said chamber;
a fluid pressure source;
a hydraulic circuit connecting said first and second fluid chambers and said fluid pressure source;
a pressure control valve disposed within said hydraulic circuit and selectively establishing and blocking fluid communication between said first and second fluid chambers and said fluid pressure source;
first means, responsive to relative displacement between a vehicle body and road wheel assembly out of a predetermined normal range, for controlling said pressure control valve so as to adjust the fluid pressure in said first and second fluid chambers in order to adjust the relative distance between said vehicle body and said road wheel assembly back to within said predetermined normal range; and
second means, responsive to bounding and rebounding motion of said road wheel relative to said vehicle body, for controlling said pressure control valve by moving the rod of said piston so as to adjust the fluid pressure in said first and second chambers to assist smooth displacement of said piston within said cylinder thereby absorbing bounding and rebounding energy which would otherwise be transmitted to said vehicle body.

16. An automotive suspension system comprising:
a hollow cylinder defining a chamber;
a piston thrustingly received within said chamber of said cylinder and defining therein first and second fluid chambers, both filled with a working fluid, said piston being free to move axially with said chamber;
a fluid pressure source;
a hydraulic circuit connecting said first and second fluid chamber and said fluid pressure source;
a pressure control valve disposed within said hydraulic circuit and selectively establishing and blocking fluid communication between said first and second fluid chambers and said fluid pressure source, said pressure control valve including a valve housing defining first and second ports respectively connected to said first and second fluid chambers, a third port connected to said fluid pressure source to introduce therefrom a fluid pressure and a fourth port connected to fluid pressure source for draining the pressurized working fluid for reducing fluid pressure, and a valve member selectively establishing fluid communication between said first and second ports and said third and fourth ports for adjusting the fluid pressure in said first and second fluid chambers;

first means, responsive to relative displacement between a vehicle body and road wheel assembly out of a predetermined normal range, for controlling said pressure control valve so as to adjust the fluid pressure in said first and second fluid chambers in order to adjust the relative distance between said vehicle body and said road wheel assembly back to within said predetermined normal range; and second means, responsive to bounding and rebounding motion of said road wheel relative to said vehicle body, for controlling said pressure control valve by moving the rod of said piston so as to adjust the fluid pressure in said first and second fluid chambers to assist smooth displacement of said piston within said cylinder thereby absorbing bounding and rebounding energy which would otherwise be transmitted to said vehicle body, said valve member including a first member cooperated with said first means and operable in response to relative displacement between said vehicle body and said road wheel assembly and a second member cooperated with said second means and operable in response to bounding and rebounding motion of said road wheel assembly.

* * * * *